US012720201B1

(12) United States Patent
Nawasra et al.

(10) Patent No.: US 12,720,201 B1
(45) Date of Patent: Aug. 25, 2026

(54) ACTUATING A LENS SYSTEM FOR CAMERA OPTICAL IMAGE STABILIZATION WITH AUTOFOCUS PROVIDED BY ACTUATING AN IMAGE SENSOR

(71) Applicant: Apple Inc., Cupertino, CA (US)

(72) Inventors: Jawad Nawasra, San Jose, CA (US); Zilun Gong, Danville, CA (US); Kyle A Rawn, Santa Cruz, CA (US); Terence N Tam, Santa Clara, CA (US); Paulom Shah, San Jose, CA (US); Obaidah A Abuhashem, Redwood City, CA (US); Scott W Miller, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 145 days.

(21) Appl. No.: 18/885,413

(22) Filed: Sep. 13, 2024

Related U.S. Application Data

(60) Provisional application No. 63/585,171, filed on Sep. 25, 2023.

(51) Int. Cl.

| | |
|---|---|
| ***H04N 23/68*** | (2023.01) |
| ***G03B 5/00*** | (2021.01) |
| ***G03B 13/36*** | (2021.01) |
| ***G03B 30/00*** | (2021.01) |

(Continued)

(52) U.S. Cl.

CPC ............. *H04N 23/687* (2023.01); *G03B 5/00* (2013.01); *G03B 13/36* (2013.01); *G03B 30/00* (2021.01); *H04N 23/55* (2023.01); *H04N 23/67* (2023.01); *G03B 2205/0007* (2013.01); *G03B 2205/0076* (2013.01)

(58) Field of Classification Search

CPC ...... H04N 23/67; H04N 23/687; H04N 23/55; G03B 5/00; G03B 13/36; G03B 30/00; G03B 2205/0007; G03B 2205/0076

See application file for complete search history.

(56) References Cited

U.S. PATENT DOCUMENTS

| | | |
|---|---|---|
| 9,007,468 B2 | 4/2015 | Washisu et al. |
| 9,609,219 B2 | 3/2017 | Howarth et al. |
| 9,615,025 B2 | 4/2017 | Gleason et al. |

(Continued)

FOREIGN PATENT DOCUMENTS

WO WO-2023209398 A1 * 11/2023 ......... F03G 7/06143

OTHER PUBLICATIONS

Actuator Assembly (Year: 2023).*

*Primary Examiner* — Twyler L Haskins
*Assistant Examiner* — Surafel Yilmakassaye
(74) *Attorney, Agent, or Firm* — S. Scott Foster; Kowert, Hood, Munyon, Rankin & Goetzel, P.C.

(57) ABSTRACT

A lens system for a camera module may be actuated to provide optical image stabilization (OIS) with autofocus (AF) provided by actuating an image sensor for the camera. The lens system may be suspended within the camera module using suspension elements that allow for OIS movements orthogonal to an optical axis of the lens system. An actuator for the lens system may cause the OIS movements. The image sensor may be suspended within the camera module using suspension elements that allow for AF movements parallel to the optical axis of the lens system. An actuator for the image sensor may cause the AF movements.

20 Claims, 6 Drawing Sheets

(51) Int. Cl.
*H04N 23/55* (2023.01)
*H04N 23/67* (2023.01)

(56) References Cited

U.S. PATENT DOCUMENTS

| | | | | |
|---|---|---|---|---|
| 11,102,416 | B2 | 8/2021 | Sharma et al. | |
| 11,125,920 | B2 | 9/2021 | Fan et al. | |
| 11,317,010 | B2 | 4/2022 | Aschwanden et al. | |
| 2014/0009631 | A1* | 1/2014 | Topliss | H04N 23/687 348/208.11 |
| 2021/0132327 | A1* | 5/2021 | Sharma | H02P 25/034 |

* cited by examiner lens carrier 302
VCM coil for OIS 414
VCM coil for AF 412
image sensor 210
magnet 416
base 303
side magnet arrangement 422
corner magnet arrangement 424
three side magnet arrangement 426

OIS actuator 401
lens system 200
lens carrier 302
AF actuator 402
base 303
image sensor 210 image sensor carrier 431
shape memory alloy actuator 432
base 303

ACTUATING A LENS SYSTEM FOR CAMERA OPTICAL IMAGE STABILIZATION WITH AUTOFOCUS PROVIDED BY ACTUATING AN IMAGE SENSOR

PRIORITY CLAIM

This application claims benefit of priority to U.S. Provisional Application Ser. No. 63/585,171, entitled "Actuating a Lens System for Camera Optical Image Stabilization with Autofocus Provided by Actuating an Image Sensor," filed Sep. 25, 2023, and which is hereby incorporated herein by reference in its entirety.

BACKGROUND

Technical Field

This disclosure relates generally to a camera and more specifically to a camera including optical image stabilization (OIS) to improve reliability.

Description of the Related Art

Mobile multipurpose devices such as smartphones, tablets, and/or pad devices are ubiquitous. Such devices integrate various functionalities in one small package, providing tremendous convenience for use in many different scenarios. Most, if not all, of today's mobile devices include at least one camera. Some cameras may incorporate an optical image stabilization (OIS) mechanism that may sense and react to external excitation/disturbance by adjusting location of an image sensor relative to a lens of the camera in an attempt to compensate for unwanted motion of the lens. Furthermore, some cameras may incorporate an autofocus (AF) mechanism whereby the object focal distance between the image sensor and the lens can be adjusted to focus an object plane in front of the camera at an image plane to be captured by the image sensor.

SUMMARY

A camera may include or be implemented as a camera module that can be incorporated into different systems or devices. The camera module may include a lens system that includes one or more lenses to capture light received through an aperture of the camera module and direct the light to an image sensor. The image sensor may generate, from the captured light, electronic image data and provide the electronic image data as a signal for further image processing. Optical image stabilization (OIS) may be implemented for the camera module to compensate for external movements or disturbances that may misalign the image sensor with the lens system. Autofocus may also be implemented for the camera module to adjust the focal length between the image sensor and the lens system.

The lens system may be suspended within the camera module using one or more suspension elements that allow for OIS movements in a direction orthogonal to the optical axis of the lens system. These suspension elements may resist movement in the direction parallel to the optical axis. One or more actuators may be implemented for the lens system to perform the OIS movements.

The image sensor may be suspended within the camera module using one or more suspension elements that allow for AF movements in a direction parallel to the optical axis of the lens system. These suspension elements may resist movement in the directions orthogonal to the optical axis. One or more actuators may be implemented for the image sensor AF movements.

Figures 1A, 1B:
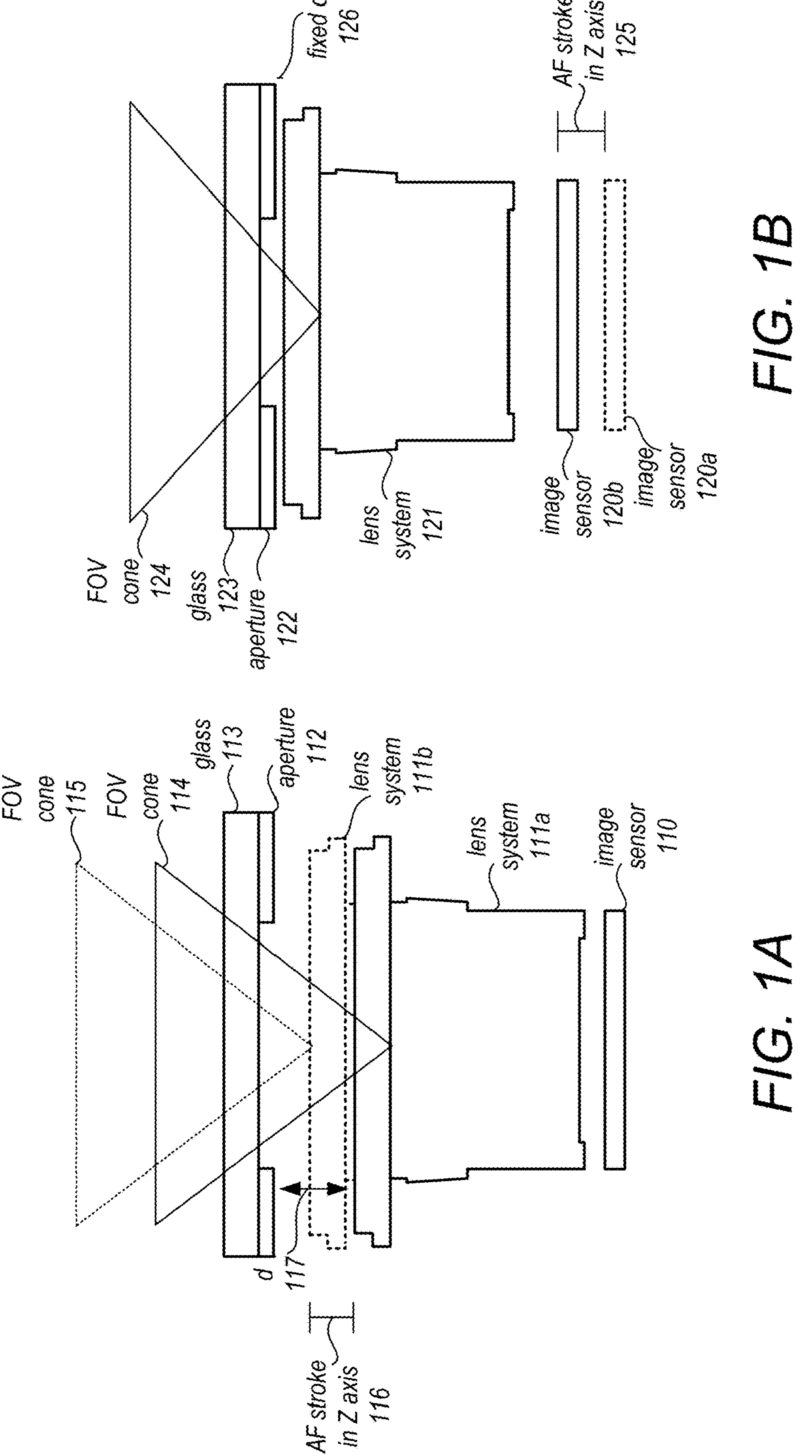
FIGS. 1A-1B illustrate different implementations of AF in a camera module, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]." depending on the context.

DETAILED DESCRIPTION

Various embodiments described herein relate to a camera module a camera module that implements actuating a lens system for OIS and providing AF by actuating an image sensor. By a actuating a lens system for OIS and providing AF by actuating an image sensor, different camera modules with different characteristics, such as ultra-wide cameras which may offer fields of view equal to or greater than 120 degrees with shorter focal lengths, can take advantage of the improved camera performance provided by implementing OIS and AF. For instance, some devices, such as mobile devices like those discussed below with regard to FIG. 5, may incorporate cameras into device designs with specific space or other design constraints. Embodiments of a camera module that implements actuating a lens system for OIS and providing AF by actuating an image sensor may allow the camera module to fit within those design constraints.

In various embodiments, a camera module may include a lens system, that includes one or more lenses, an image sensor, and respective suspension elements and actuators that allow the lens system to perform movements, within the camera module, to implement OIS and the image sensor to perform movements, within the camera module, to implement AF. The camera module may include at least one aperture to pass through light to the one or more lenses. The lenses may further pass through the light to the image sensor. The image sensor may generate image signals, e.g., electrical signature, based on light received from the lenses, and the image signals may be further processed by a processor to produce an image. In some embodiments, the device may be a mobile multipurpose device, such as a smartphone, table, pad device, and the like.

In some embodiments, the lens system and/or the image sensor of the camera module may be movable relative to one another to implement various camera functions. For instance, in some embodiments, the camera module may implement suspension element(s) for the lens system, such as a ball bearing suspension element, a wire suspension element, and/or a flexure suspension element. The suspension element(s) for the lens system may allow movement of the lens system in directions orthogonal (e.g., X and Y axes) to an optical axis of the lenses (or Z-axis) to compensate for unwanted misalignment between the image sensor and one or more lenses to implement OIS. The suspension element(s) for the lens system may, in some embodiments, resist movement of the lens system in the direction of the optical axis. In some embodiments, the camera module may implement suspension element(s) for the image sensor, such as a ball bearing suspension element and/or a flexure suspension element. The suspension element(s) for the image may allow movement of the image in a direction parallel to the optical axis of the lenses (or Z-axis) to adjust the focal length between the image sensor and the one or more lenses to implement AF. The suspension element(s) for the image sensor may, in some embodiments, resist movement of the image sensor in the directions orthogonal to the optical axis.

In some embodiments, the camera module may use one or more actuators, such as one or more voice coil motor (VCM) actuators or shape memory alloy to control movement of the movable component (e.g., the lens system or the image sensor). For instance, a VCM actuator may include one or more coils and one or more corresponding magnets. The magnets may be attached to a first component, whilst the coils may be affixed to a second component. The coils may conduct current that may electromagnetically interact with magnetic fields of the magnets to generate motive force (e.g., Lorentz force) to move the first component relative to the second component. In another example, shape memory alloy (SMA) wires may be attached to two (or more) components. When "cold," the SMA wires may be in a "loose" state. However, when electric current is applied, the SMA wires may become "hot" and return to a remembered shape, and thus may be in a "contracted" state. Using one or more multiple SMA wires affixed to different components within the camera module may be used as an actuator to effect the movement of moveable components by changing between contracted and loose states.

FIG. 1A illustrates an example of components within a camera module where the lens system is actuating to provide AF. Image sensor 110 may be suspended below lens system 111. Light may be captured through glass 113 and proceed through aperture 112 and lens system 111, suspended above image sensor 110, which directs the light to image sensor 110. AF stroke 116 may be the movement that may occur in parallel with the optical axis of lens system 111, which is referred to as the Z-axis. As depicted in in FIG. 1A, lens system 111 moves between positions at 111*a* and 111*b* in order to implement AF. Because of the movement of the lens system 111, the field-of-view cone may also move (e.g., where FOV cone 114 corresponds to lens system position 111*a* and FOV cone 115 corresponds to lens system position 111*b*). Accordingly, the distance d 117 between the lens system 111 and the aperture may be dynamic. Additionally, aperture 112 may have to be wide enough to support the field-of-view throughout the range of lens system movement depicted by AF stroke 116.

FIG. 1B illustrates an example of components within a camera module where the image sensor is actuating to provide AF, according to some embodiments. Such embodiments offer many performance advantages over systems that implement AF by moving a lens system. As depicted in FIG. 1B, image sensor 120 is in two different positions, 120*a* and 120*b* in order to provide the AF stroke in the Z-axis 125. In many embodiments, image sensor 120 has a significantly smaller mass than lens system 121 and may consume less energy in order to perform AF movements using different actuators. Accordingly, image sensor 120 actuation may provide a more power efficient implementation of AF. As power consumption is a constant challenge in mobile devices which might implement a camera module, the implementation of image sensor actuation for AF can help to overcome this challenge while still providing the performance benefits of AF for capturing image data.

Additionally, as depicted in FIG. 1B, d 126, the distance between lens system 121 and aperture 122 may be fixed. FOV cone 124 may also then be fixed so that when light is captured through glass 123, aperture 122 may be reduced to be more closely fitted to FOV cone 124. As discussed below with regard to FIG. 2, OIS movements of lens system 121 may still have to be accounted for in the size of aperture 122. However, OIS movements may be relatively smaller to AF movements and thus the size of aperture 122 to accommodate these OIS movements while d 126 is fixed may be smaller than the size of aperture 112, which has to accommodate a dynamic d 117. Such techniques help to overcome space utilizing challenges, often a concern in mobile devices.

Figure 2:
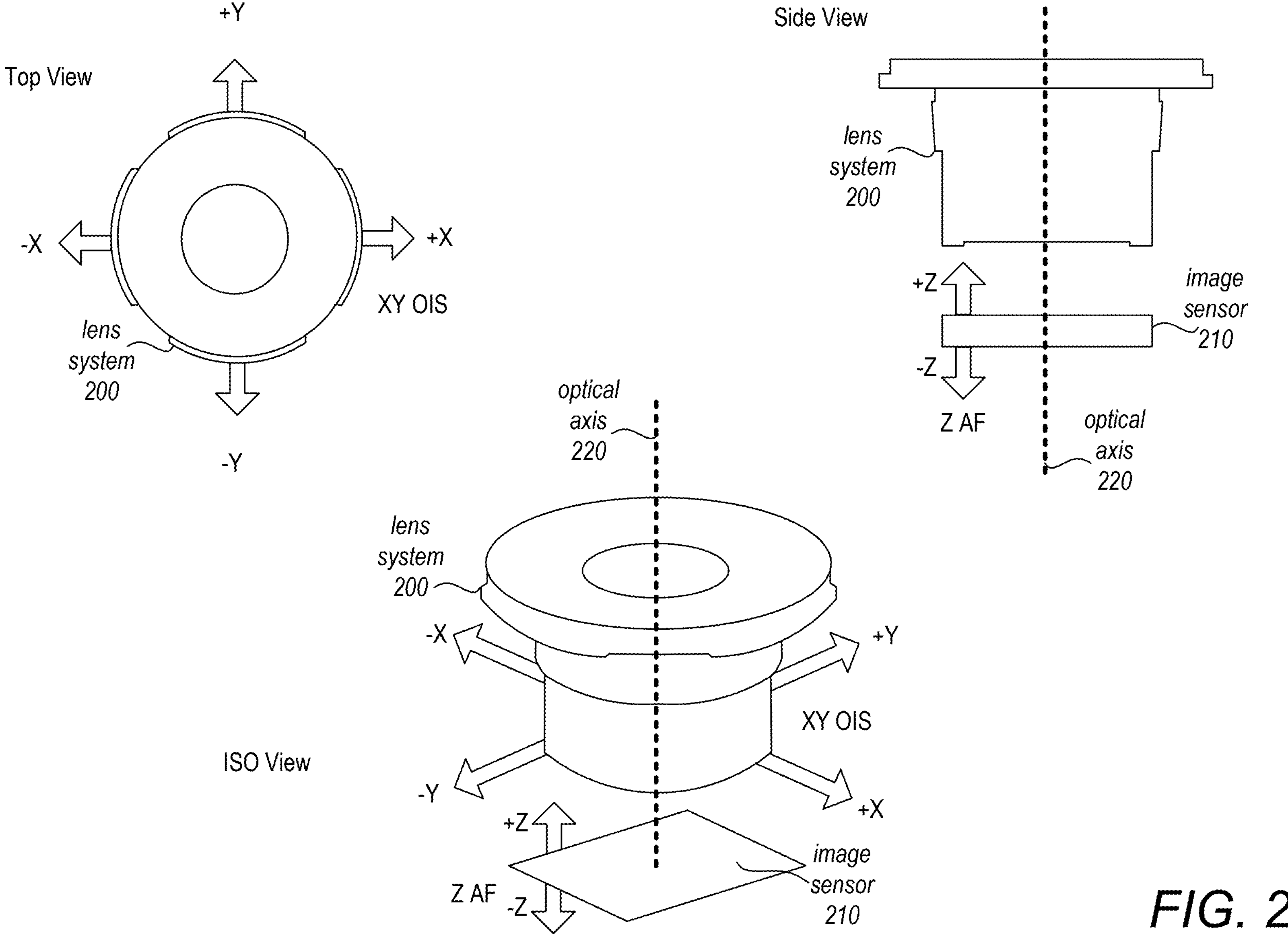
FIG. 2 illustrates different views of a camera module that implements actuating a lens system for OIS and providing AF by actuating an image sensor, according to some embodiments.

FIG. 2 illustrates different views of a camera module that implements actuating a lens system for OIS and providing AF by actuating an image sensor (similar to FIG. 1B discussed above), according to some embodiments. In top view, lens system 200 is depicted. As discussed in FIGS. 3A-4C, lens system 200 may be suspended within a camera module an actuated in directions orthogonal to an optical axis of lens system 200 (e.g., movements in the +X, +Y, −X, and −Y directions) to provide OIS. The side view depicts AF movements of image sensor 210 (e.g., movements in +Z and −Z directions) to provide AF parallel to optical axis 220 of lens system 200. The isometric view depicts both the AF movements of image sensor 210 (e.g., movements in +Z and −Z directions) to provide AF parallel to optical axis 220 of lens system 200 and lens system 200 movements actuated in directions orthogonal to an optical axis of lens system 200 (e.g., movements in the +X, +Y, −X, and −Y directions) to provide OIS.

In some embodiments, lens system 200 may implement an ultra-wide lens. An ultra-wide lens may have a shorter focal length (e.g., with respect to wide or standard photographic lens). For example, a wide angle lens may have a focal length of approximately 3 times longer than that of an ultra-wide lens (e.g., a 6.6 millimeter (mm) focal length compared to a 2.2 millimeter focal length). The reduction in focal length provided by an ultra-wide lens may minimize the amount of movement to perform in order to compensate as part of OIS. For example, a 2-1 ratio of AF to OIS movement (e.g., the distance of an OIS movement may be half of an AF movement). Given that AF movement may already be small because of the short focal length characteristic of ultra-wide lenses, the amount of movement to provide OIS may be proportionally even smaller. By actuating the lens system to provide OIS, the larger mass (with respect to the image sensor) is moved the smaller distance, providing an optimal use of power to actuate OIS. Consider the following example. In order to provide 1 degree of compensation for an ultra-wide lens of approximately 2 millimeter focal length, a range of approximately 40 microns (μm) may be provided.

Figure 3D:
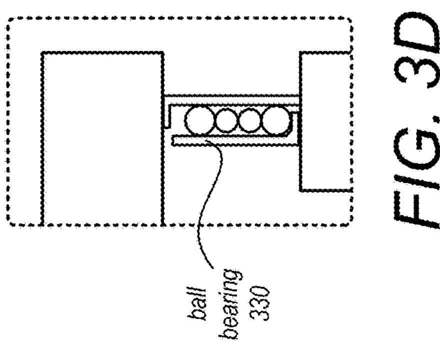
FIGS. 3B-3D illustrate different examples of suspension elements, according to some embodiments.
Figure 3B:
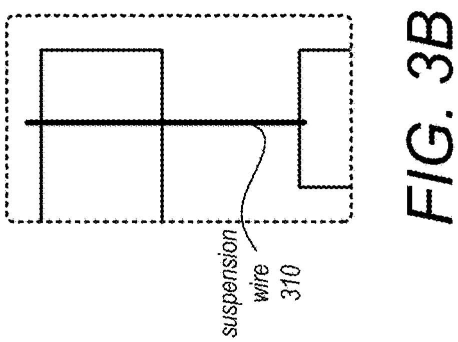
Figure 3C:
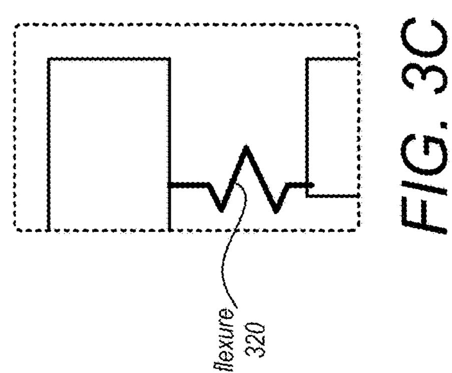
Figure 3A:
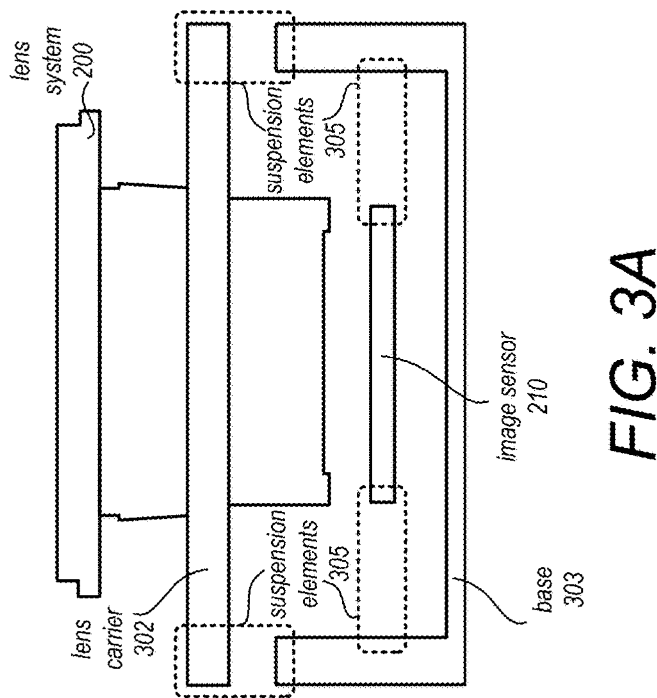
FIG. 3A illustrates a side view of a camera module, including suspension elements, that allow actuating a lens system for OIS and providing AF by actuating an image sensor, according to some embodiments.

FIG. 3A illustrates a side view of a camera module, including suspension elements, that allow actuating a lens system for OIS and providing AF by actuating an image sensor, according to some embodiments. Lens system 200 and image sensor 210 may be included within a camera module that includes various structures or components to facilitate OIS and AF. Other components, layers, or structures within a camera module may not be depicted. For example, electrical traces or other components to obtain image data captured by image sensor 210 and transport the image data as a signal from image sensor 210 to other components (e.g., image processing components of an incorporating device or system of the camera module) are not illustrated but may be present in the camera module. Additionally, in various embodiments, different arrangements of those elements depicted in FIG. 3A may also be implemented. For instance, lens carrier 302 may connect to or be implemented as part of other camera module components or may be shaped or placed differently with respect to those other components. Accordingly, the FIG. 3A provides an example of suspension elements that may be implemented in a camera module and should not be construed as limiting as to other embodiments of a camera module that that allow actuating a lens system for OIS and providing AF by actuating an image sensor.

In FIG. 3A base 303 may be a base layer (or a lower layer) within a camera module that incorporates lens system 200, lens carrier 302 and image sensor 210. Different respective suspension elements 305 may be used to suspend both lens carrier 302 and image sensor 210 within a camera module. Although being depicted as the component to which both lens carrier 302 and image sensor 210 are suspended from in FIG. 3A, in other embodiments additional or different components from base 303 may be used for suspending one or both of lens system 200 and image sensor 210. Suspension elements 305 for lens carrier 302 and lens system 200 may allow for movement in directions orthogonal to the optical axis (as depicted in FIG. 2). In some embodiments, these suspension elements may resist movement in the direction of AF (e.g., in the Z direction that is parallel to the optical axis).

For example, in FIG. 3B, a suspension wire 310 is depicted. In the example depiction, suspension wire 310 could be attached to both base 303 and lens carrier 302. Suspension wire 310 may allow for OIS movements, as lens carrier 302 could be moved in the +X, +Y, −X, and −Y directions bending suspension wire 310 in those directions, whereas for movement in the Z-axis, suspension wire 310 may remain stiff and unbending.

FIG. 3C illustrates an example of a flexure 320 as a suspension element 305. Flexure 320 may be a component for communicating power and electronic signals between electronic components (e.g., an image sensor, drivers, voltage regulators, and the like) coupled to a dynamic platform and a remainder of a camera module that is static. For example, the flexure may be coupled using a flexure arm between a static base 303 and lens carrier 302 and/or between base 303 and a platform for image sensor 210. The placement and shape of flexure arms may allow for movement in desired directions (e.g., in XY directions for OIS or Z direction for AF) and resistance in non-desired directions. In various embodiments, a flexure may support communication of, for example, 8K30FPS and 4K120 video modes, higher data rates per flexure arm and/or electrical traces of the flexure may provide support while maintaining a same quantity of flexure arms and/or electrical traces of the flexure. As these electronic components increase in capability, the available bandwidth and signal integrity across the flexure may be increased to support the increased capability. To improve signal integrity and increase a data rate, an impedance on the flexure and a tolerance on the flexure may be reduced. For example, a cross-sectional area of one or more electrical traces through a flexure arm may be increased to lower impedance and reduce tolerances of the flexure. As another example, a width of one or more flexure arms of the flexure may be increased to lower impedance and reduce tolerances on the flexure. As another example, a distance between electrical traces on a flexure arm may be increased to reduce cross talk between the electrical traces. As another example, a width of one or more flexure arms of the flexure may be increased to lower impedance and reduce tolerances on the flexure. However, an increase in flexure arm width and/or an increase in electrical trace cross-sectional size may increases a stiffness of the flexure arms and the flexure. Modifying (e.g., increasing) a width of one or more flexure arms of a set of flexure arms of the flexure and/or modifying (e.g., increasing) a cross-sectional area of electrical trace(s) through a flexure arm and associating those one or more flexure arms with a high-speed data link (HS-DL) while maintaining a stiffness of the set of flexure arms to be substantially similar to a stiffness of a second set of flexure arms at an opposite corner of the flexure may improve signal integrity and increase a bandwidth across the flexure.

FIG. 3D illustrates an example of a ball bearing 330 that includes one or more multiple rolling elements that can be implemented as one of suspension elements 305. For example, an OIS bearing suspension arrangement may include multiple stages (e.g., an X stage and the Y stage in), and an AF bearing suspension arrangement may include one stage (e.g., a Z stage), and each of the stages may be configured to move on ball bearings (which may be balls or other rolling elements) so as to allow motion enabled by the actuator(s). In some embodiments, each of the stages may comprise a respective moveable structure (e.g., a holder, a frame, and/or a platform, etc.) that is coupled with one or more components of the camera module so as to suspend such component(s) from the base structure, and the respective moveable structure is moveable (e.g., via the actuator (s)) on ball bearings in at least one direction so as to correspondingly move the component(s) coupled therewith.

Different arrangements or combinations of different suspension elements may be implemented in various embodiments. For example, a flexure suspension element 320 may be used for image sensor 210 while a ball bearing 330 suspension element for lens system 200. Additionally, other suspension elements not depicted in FIGS. 3B-3D may be implemented. For example, spring suspension elements may be used.

Figures 4A, 4B, 4C:
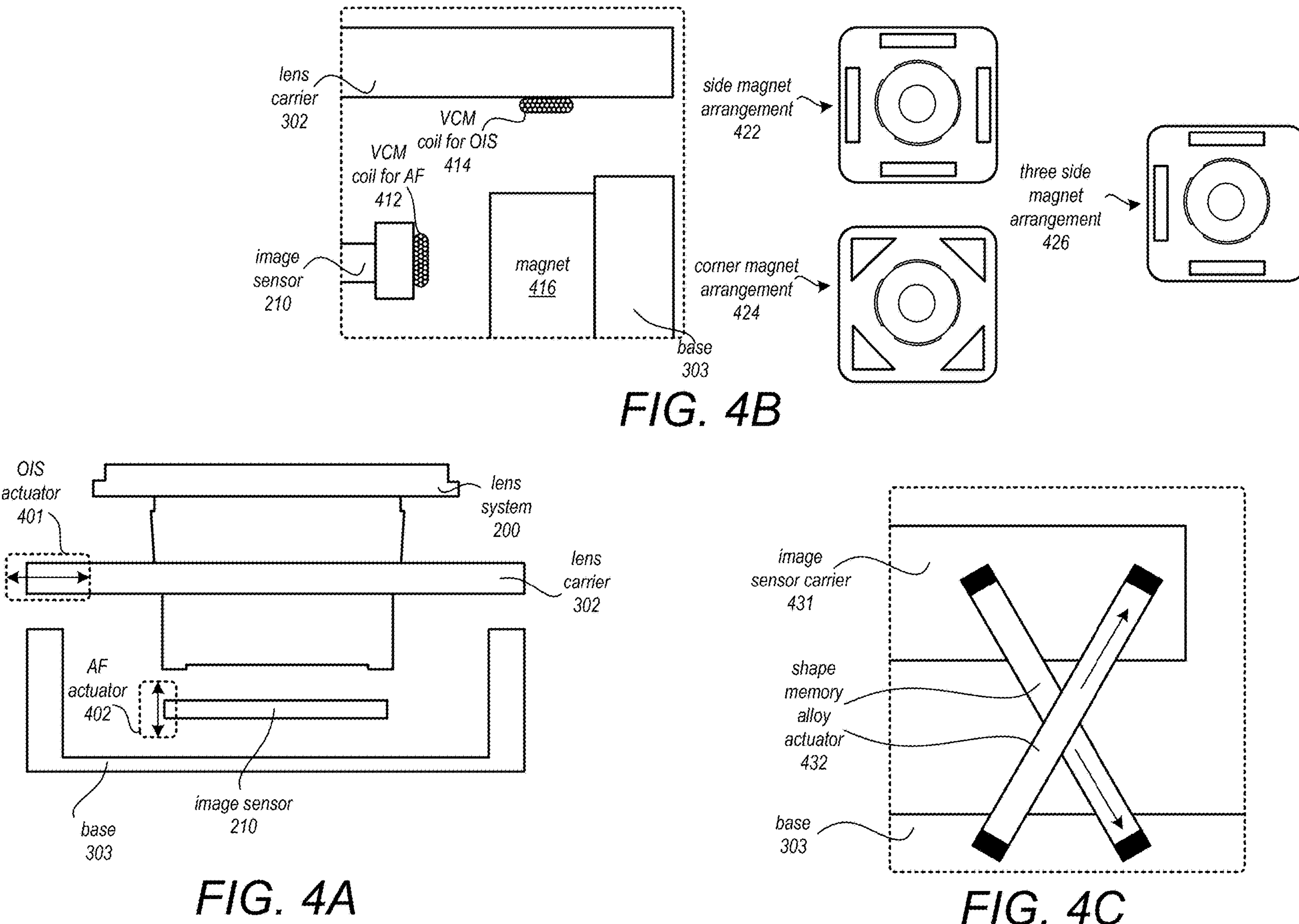
FIG. 4A illustrates a side view of a camera module, including actuators for AF and OIS, that allow actuating a lens system for OIS and providing AF by actuating an image sensor, according to some embodiments.
FIG. 4B-4C illustrate different examples of actuators, according to some embodiments.

FIG. 4A illustrates a side view of a camera module, including OIS actuator(s) 401 and AF actuator(s) 402, that allow actuating a lens system for OIS and providing AF by actuating an image sensor, according to some embodiments. As noted above, lens system 200 and image sensor 210 may be included within a camera module that includes various structures or components to facilitate OIS and AF. Other components, layers, or structures within a camera module may not be depicted. For example, electrical traces or other components to obtain image data captured by image sensor 210 and transport the image data as a signal from image sensor 210 to other components (e.g., image processing components of an incorporating device or system of the camera module) are not illustrated but may be present in the camera module. Additionally, in various embodiments, different arrangements of those elements depicted in FIG. 4A may also be implemented. For instance, lens carrier 302 may connect to or be implemented as part of other camera module components or may be shaped or placed differently with respect to those other components. Accordingly, FIG. 4A provides an example of actuators that may be implemented in a camera module and should not be construed as limiting as to other embodiments of a camera module that that allow actuating a lens system for OIS and providing AF by actuating an image sensor.

OIS actuator 401 may cause movements in directions (e.g., XY) orthogonal to the optical axis (e.g., Z) responsive to an OIS controller which may detect and react to external excitation/disturbance by adjusting location of lens system 30 on the X and/or Y axis in an attempt to compensate for unwanted motion of the lens. The OIS controller may be implemented using various processing circuitry (e.g., dedicated circuitry that detects, determines, and instructs OIS movements or processor component that executes instructions, such as firmware, that detects, determines, and instructions OIS movements).

AF actuator 402 may cause movements in directions (e.g., Z) parallel to the optical axis) responsive to an AF controller, which may detect and react to objects of interest in a field-of-view to adjust the focal length with between image sensor 210 and lens system 200 in order to bring those objects of interest into focus. The AF controller may be implemented using various processing circuitry (e.g., dedicated circuitry that detects, determines, and instructs AF movements or processor component that executes instructions, such as firmware, that detects, determines, and instructions OIS movements).

OIS actuator 401 and AF actuator 402 may implemented using different actuating components and techniques. FIG. 4B illustrates an example of voice coil motor (VCM) actuator techniques, in some embodiments. As noted above, VCM may include one or more coils and one or more corresponding magnets. The magnets may be attached to a first component, whilst the coils may be affixed to a second component, such as VCM coil 424 attached to lens carrier 302 and VCM coil 412 attached to a carrier or platform for image sensor 210. These coils may conduct current that may electromagnetically interact with magnetic fields of magnets, such as magnet 416, to generate motive force (e.g., Lorentz force). For example VCM coil for OIS 414 may move lens carrier 302 in an X or Y direction for OIS movements by generating a motive force using magnet 416. Similarly, VCM coil for AF 412 may move image sensor 210 in a Z direction for AF movements by generating a motive force using magnet 416. VCM techniques may be implemented in different ways with corresponding VCM coils placed in different ways in accordance with different magnet arrangements. For example, side magnet arrangement 422 demonstrates the use of 4 rectangular magnets each positioned on opposite sides of a camera module. In another example, corner magnet arrangement 424 positions 4 magnets in opposite corners of a camera module. In another example, a three side magnet arrangement 426 with 3 magnets on 3 of the 4 camera sides is illustrated. Various other numbers of magnets and arrangements of magnets may be implemented in other embodiments.

FIG. 4C illustrates an example of shape memory alloy (SMA) wires used to actuate movements in a camera module for OIS or AF. For example, (SMA) wires 432 may be positioned to connect two (or more) components, such as image sensor carrier 431 and base 303. Each SMA wire 432 may provide a corresponding direction of movement which is caused according to the application of current to one of the SMA wires 432 to change from cold to hot, causing the "loose" state of the SMA wire to return to the "contracted" state (e.g., as depicted by the directional errors on SMA wires of SMA actuator 432). Although depicted as connecting image sensor carrier 431 and bases 303 other connections or SMA wire arrangements could be used to facilitate the same or different movements in the same or different directions (as desired to support actuating movements for OIS or AF). Accordingly, the example illustrated in FIG. 4C is not intended to be limiting.

Different arrangements or combinations of different actuators may be implemented in various embodiments. For example, VCM coil for OIS 414 may be used for lens carrier 302 to actuate OIS movements while SMA wires of an SMA actuator 432 may be implemented to move image sensor 210 to actuate AF movements. Additionally, other actuators not depicted in FIGS. 3B-3D may be implemented. For example, mechanical actuators (e.g., using screws) may be used.

Figure 5:
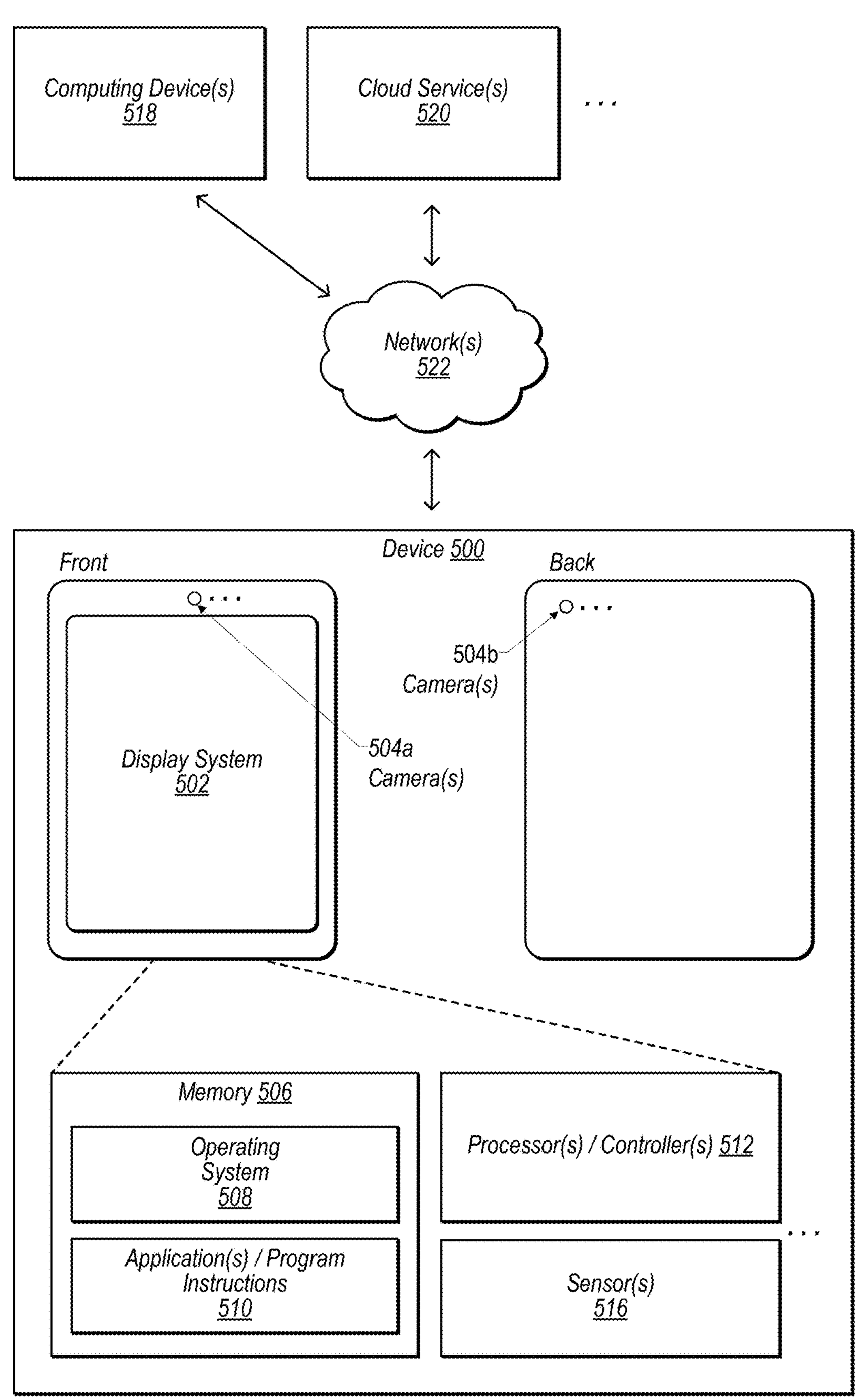
FIG. 5 shows a schematic representation of an example device incorporating a camera module that implements actuating a lens system for OIS and providing AF by actuating an image sensor, according to some embodiments.

FIG. 5 shows a schematic representation of an example device incorporating a camera module that implements actuating a lens system for OIS and providing AF by actuating an image sensor, according to some embodiments, as discussed above with regard to FIGS. 1B-4C. In some embodiments, the device 500 may be a mobile device and/or a multifunction device. In various embodiments, the device 500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 500 may include a display system 502 (e.g., comprising a display and/or a touch-sensitive surface) and/or one or more cameras 504. In some non-limiting embodiments, the display system 502 and/or one or more front-facing cameras **504*a* (e.g., incorporated as camera modules) may be provided at a front side of the device 500, e.g., as indicated in FIG. 5. Additionally, or alternatively, one or more rear-facing cameras 504*b* 504*a* (e.g., incorporated as camera modules) may be provided at a rear side of the device 500. In some embodiments comprising multiple cameras 504, some or all of the cameras may be the same as, or similar to, each other. Additionally, or alternatively, some or all of the cameras may be different from each other. In various embodiments, the location(s) and/or arrangement(s) of the camera(s) 504 may be different than those indicated in FIG. 5**.

Among other things, the device 500 may include memory 506 (e.g., comprising an operating system 508 and/or application(s)/program instructions 510), one or more processors and/or controllers 512 (e.g., comprising CPU(s), memory controller(s), display controller(s), and/or camera controller (s), etc.), and/or one or more sensors 516 (e.g., orientation sensor(s), proximity sensor(s), and/or position sensor(s), etc.). In some embodiments, the device 500 may communicate with one or more other devices and/or services, such as computing device(s) 518, cloud service(s) 520, etc., via one or more networks 522. For example, the device 500 may include a network interface (e.g., network interface 610) that enables the device 500 to transmit data to, and receive data from, the network(s) 522. Additionally, or alternatively, the device 500 may be capable of communicating with other devices via wireless communication using any of a variety of communications standards, protocols, and/or technologies.

Figure 6:
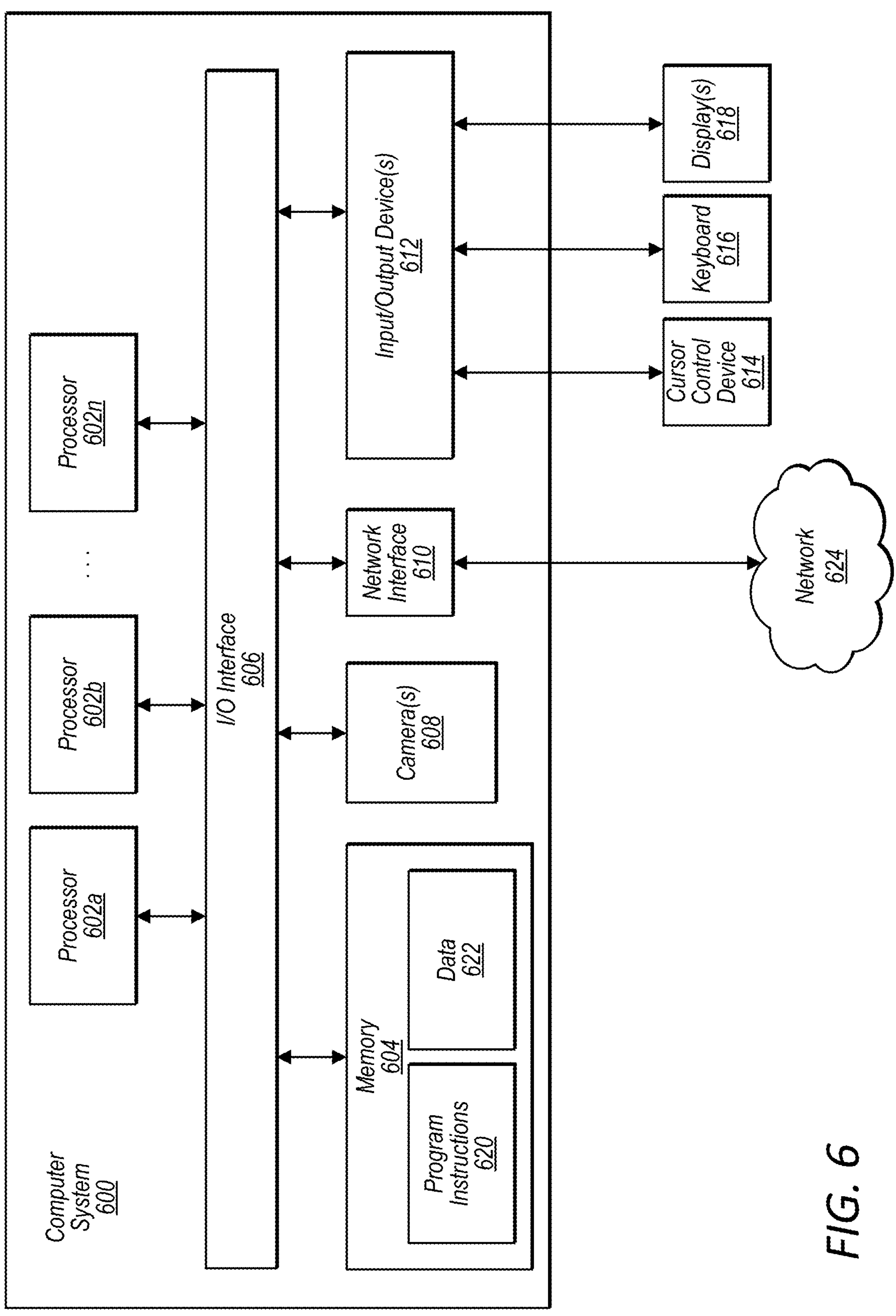
FIG. 6 shows a schematic block diagram of an example computer system that has a camera module that implements actuating a lens system for OIS and providing AF by actuating an image sensor, according to some embodiments.

FIG. 6 illustrates a schematic block diagram of an example computing device, referred to as computer system 600, that has a camera module that implements actuating a lens system for OIS and providing AF by actuating an image sensor, according to some embodiments. In addition, computer system 600 may implement methods for controlling operations of the camera and/or for performing image processing images captured with the camera. In some embodiments, the device 500 (described herein with reference to FIG. 5) may additionally, or alternatively, include some or all of the functional components of the computer system 600 described herein.

The computer system 600 may be configured to execute any or all of the embodiments described above. In different embodiments, computer system 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 600 includes one or more processors 602 coupled to a system memory 604 via an input/output (I/O) interface 606. Computer system 600 further includes one or more cameras 608 (e.g., incorporated as camera modules) coupled to the I/O interface 606. Computer system 600 further includes a network interface 610 coupled to I/O interface 606, and one or more input/output devices 612, such as cursor control device 614, keyboard 616, and display(s) 618. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 602, or a multiprocessor system including several processors 602 (e.g., two, four, eight, or another suitable number). Processors 602 may be any suitable processor capable of executing instructions. For example, in various embodiments processors 602 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 602 may include additional types of processors, such as graphics processing units (GPUs), application specific integrated circuits (ASICs), etc. In multiprocessor systems, each of processors 602 may commonly, but not necessarily, implement the same ISA. In some embodiments, computer system 600 may be implemented as a system on a chip (SoC). For example, in some embodiments, processors 602, memory 604, I/O interface 606 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 604 may be configured to store program instructions 620 accessible by processor 602. In various embodiments, system memory 604 may be implemented using any suitable memory technology, such as static random access memory (SRAM), synchronous dynamic RAM (SDRAM), nonvolatile/Flash-type memory, or any other type of memory. Additionally, existing camera control data 622 of memory 604 may include any of the information or data structures described above. In some embodiments, program instructions 620 and/or data 622 may be received, sent or stored upon different types of computer-accessible media or on similar media separate from system memory 604 or computer system 600. In various embodiments, some or all of the functionality described herein may be implemented via such a computer system 600.

In one embodiment, I/O interface 606 may be configured to coordinate I/O traffic between processor 602, system memory 604, and any peripheral devices in the device, including network interface 610 or other peripheral interfaces, such as input/output devices 612. In some embodiments, I/O interface 606 may perform any necessary protocol, timing or other data transformations to convert data signals from one component (e.g., system memory 604) into a format suitable for use by another component (e.g., processor 602). In some embodiments, I/O interface 606 may include support for devices attached through various types of peripheral buses, such as a variant of the Peripheral Component Interconnect (PCI) bus standard or the Universal Serial Bus (USB) standard, for example. In some embodiments, the function of I/O interface 606 may be split into two or more separate components, such as a north bridge and a south bridge, for example. Also, in some embodiments some or all of the functionality of I/O interface 606, such as an interface to system memory 604, may be incorporated directly into processor 602.

Network interface 610 may be configured to allow data to be exchanged between computer system 600 and other devices attached to a network 624 (e.g., carrier or agent devices) or between nodes of computer system 600. Network 624 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 610 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 612 may, in some embodiments, include one or more display terminals, keyboards, keypads, touchpads, scanning devices, voice or optical recognition devices, or any other devices suitable for entering or accessing data by one or more computer systems 600. Multiple input/output devices 612 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 610.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera module, comprising:

a lens system, comprising one or more lenses that are configured to direct light received through an aperture of the camera module to an image sensor;

a first one or more suspension elements for the lens system that are configured to allow movement in directions orthogonal to an optical axis of the lens system and resist movement in a direction parallel to the optical axis of the lens system;

a first one or more actuators configured to move the lens system in the directions orthogonal to the optical axis to provide Optical Image Stabilization (OIS) movements;

the image sensor, configured to generate image signals based on the light received from the lens system;

a second one or more suspension elements for the image sensor that are configured to allow movement in the direction parallel to the optical axis of the lens system and resist movement in the directions orthogonal to the optical axis of the lens system; and a second one or more actuators configured to move the image sensor in the direction parallel to the optical axis to provide Auto Focus (AF) movements.

2. The camera module of claim 1, wherein the first one or more suspension elements for the lens system comprise a suspension wire.

3. The camera module of claim 1, wherein the second one or more suspension elements for the image sensor comprise a flexure.

4. The camera module of claim 1, wherein the first one or more suspension elements for the lens system comprise a flexure.

5. The camera module of claim 1, wherein the second one or more suspension elements for the image sensor comprise a ball bearing.

6. The camera module of claim 1, wherein the first one or more actuators comprise shape memory alloy.

7. The camera module of claim 1, wherein the one or more lenses of the lens system provide an ultra-wide field-of-view greater than or equal to 120 degrees.

8. A device, comprising:

one or more processors;

memory storing program instructions executable by the one or more processors to control operation of a camera module; and the camera module, comprising:

a lens system, comprising one or more lenses that are configured to direct light received through an aperture of the camera module to an image sensor;

a first one or more suspension elements for the lens system that are configured to allow movement in directions orthogonal to an optical axis of the lens system and resist movement in a direction parallel to the optical axis of the lens system;

a first one or more actuators configured to move the lens system in the directions orthogonal to the optical axis to provide Optical Image Stabilization (OIS) movements;

the image sensor, configured to generate image signals based on the light received from the lens system;

a second one or more suspension elements for the image sensor that are configured to allow movement in the direction parallel to the optical axis of the lens system and resist movement in the directions orthogonal to the optical axis of the lens system; and a second one or more actuators configured to move the image sensor in the direction parallel to the optical axis to provide Auto Focus (AF) movements.

9. The device of claim 8, wherein the first one or more suspension elements for the lens system comprise a ball bearing.

10. The device of claim 8, wherein the second one or more suspension elements for the lens system comprise a flexure.

11. The device of claim 8, wherein the first one or more suspension elements for the lens system comprise a flexure.

12. The device of claim 8, wherein the second one or more suspension elements for the lens system comprise a ball bearing.

13. The device of claim 8, wherein the first one or more actuators comprise one or more voice coil motors.

14. The device of claim 8, wherein the second one or more actuators comprise shape memory alloy.

15. A system, comprising:

a lens system, comprising one or more lenses that are configured to direct light received through an aperture of the camera module to an image sensor;

a first one or more suspension elements for the lens system that are configured to allow movement in directions orthogonal to an optical axis of the lens system and resist movement in a direction parallel to the optical axis of the lens system;

a first one or more actuators configured to move the lens system in the directions orthogonal to the optical axis to provide Optical Image Stabilization (OIS) movements;

the image sensor, configured to generate image signals based on the light received from the lens system;

a second one or more suspension elements for the image sensor that are configured to allow movement in the direction parallel to the optical axis of the lens system and resist movement in the directions orthogonal to the optical axis of the lens system;

a second one or more actuators configured to move the image sensor in the direction parallel to the optical axis to provide Auto Focus (AF) movements; and processing circuitry, configured to cause the OIS movements and the AF movements.

16. The system of claim 15, wherein the first one or more suspension elements comprise a flexure.

17. The system of claim 15, wherein the second one or more suspension elements comprise a flexure.

18. The system of claim 15, wherein the first one or more suspension elements comprise a ball bearing.

19. The system of claim 15, wherein the first one or more actuators comprise shape memory alloy.

20. The system of claim 15, wherein the second one or more actuators comprise a voice coil motor.

* * * * *